United States Patent Office 3,136,758
Patented June 9, 1964

3,136,758
Δ¹⁶-20-KETO-PREGNENE DERIVATIVES AND
THEIR PREPARATION
John M. Chemerda, Metuchen, and William V. Ruyle, Westfield, N.J., and Leon Mandell, Army Chemical Center, Md., assignors to Merck & Co., Inc., Rahway, N.J., a corporation of New Jersey
No Drawing. Filed Feb. 15, 1954, Ser. No. 410,456
24 Claims. (Cl. 260—239.55)

This invention relates to steroidal hormone intermediates and to processes for preparing them, and particularly to improved processes for the conversion of sapogenin compounds into their pseudo-form and to new steroidal sapogenin derivatives thus obtained. These products can be converted by known procedures into steroid hormones and other physiologically active substances.

Processes have been previously described for converting sapogenins into pregnene derivatives having the characteristic 20-keto group of steroid hormones. One such process consists of treating sapogenins with an organic acid anhydride at high temperature for long periods of time to form pseudosapogenins, and when the reaction temperature is below 175° C., it is necessary to carry out the reaction under superatmospheric pressure. The pseudo-sapogenins may then be converted by mild oxidation and hydrolysis to a Δ¹⁶-20-keto pregnene derivative. A second process for such conversion may be carried out under normal pressure conditions and below 175° C. by the addition of an acidic catalyst to the organic acid anhydride although the yields of pseudo-sapogenins are low.

A primary object of this invention is to form pseudo-sapogenins from sapogenins in relatively high yield under mild reaction conditions. A related object is to prepare new steroidal sapogenin derivatives which can readily be converted to pregnene derivatives. A further object is to provide a simple and effective method, without the necessity of extensive heating, of converting sapogenins into 20-keto pregnene derivatives readily convertible into hormones such as those having cortical activity. Other objects and the advantages of this invention will appear hereinafter.

In accordance with the invention, a sapogenin (Compound I) is treated with an acylating agent in the presence of an amine catalyst to form the corresponding pseudo-sapogenin (Compound II) and then the reaction mixture thus formed is further reacted without isolating the pseudo-sapogenin with an oxidizing agent to form a 16-acyloxy pregnene compound (Compound III), followed by heating in an acidic medium to convert this latter compound to the corresponding 20-keto-pregnene derivative (Compound IV). These reactions may be chemically represented insofar as the changes occurring in the substituent attached to ring D of the steroid nucleus are concerned as follows:

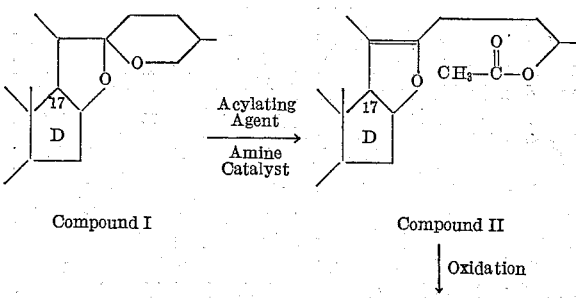

Compound I                Compound II
                          ↓ Oxidation

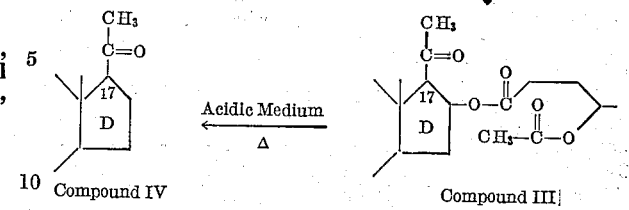

Compound IV               Compound III

The sapogenins readily react with the acylating agent at atmospheric pressure in the presence of an amine catalyst to give a high yield of the corresponding pseudo-sapogenin. The reaction may be carried out in a wide range of concentrations, but it is preferred to use for each mole of sapogenin from 3 to 4 moles of tertiary amine and from 3 to 4 moles of the acylating agent. The sapogenin may be any of the sapogenin compounds having the characteristic spirostan side chain such as tigogenin, digitogenin, gitogenin, chlorogenin, diosgenin, sarsasapogenins or further substituted compounds such as esters and polyesters, as for example, diosgenin acetate or chlorogenin diacetate, chloro-substituted sapogenins or ketones obtained by oxidation of the nuclear hydroxy groups.

The acylating agent may be any of the usual acylating agents such as organic acid anhydrides, or an organic acid chloride with a salt of an organic acid, as for example, acetic, propionic, n-butyric or succinic anhydride, or benzoyl chloride with sodium acetate. It is preferred to use as the acylating agent alkanoic anhydrides having boiling points below 175° C. at atmospheric pressure since their use simplifies the reaction.

In a preferred embodiment, the acylating agent comprises, in addition to the normal acylating agent such as described hereinabove, one or more reaction-promoting substances such as acidic agents. Suitable acidic agents are inorganic acids, acid-reacting inorganic salts of metals and non-metals such as halides and organic sulfonic acids. Typical examples of these types of agents are sulfonic acid, perchloric acids, zinc chloride, thionyl chloride, and methyl sulfonic acid. Particularly useful agents of this type are hydrogen chloride and acetyl chloride.

The amine catalyst is a tertiary amine or the acid salt thereof. The preferred catalyst is a high boiling amine since it simplifies reaction conditions. Examples of suitable amines are pyridine, quinoline, the collidines, diethylaniline, dimethyl aniline, and pyridine hydrochloride. The amine catalyst is preferably used in greater molar quantities than the sapogenin starting material. If the acylating agent contains an acidic agent, it is preferred to use an excess of the amine catalyst over the acidic agent.

The preparation of the pseudo-sapogenins is preferably carried out by treating the sapogenin with a lower alkanoic anhydride in the presence of hydrogen chloride or acetyl chloride and with an excess of amine catalyst. The sapogenin is suspended or dispersed in the reactant and the mixture heated at about reflux temperature, below 175° C., for a period of approximately three hours.

The pseudo-sapogenin compound, when prepared according to this process, may be oxidized directly without separation from the reaction mixture by the addition of a mild oxidizing agent preferably in an organic acid solvent, such as a solution of chromic acid in aqueous acetic acid. This discovery greatly reduces the cost of the process since it is not necessary to isolate the product before oxidation. The oxidation is carried out by merely mixing the reactants together until the pseudo-sapogenin is oxidized, which usually requires approximately one-half hour.

At the end of the oxidation period, the oxidizing agent is destroyed by the addition of a suitable agent, as for example, methanol. The oxidized product is then heated without separation from the reaction mixture in an acidic medium to produce the pregnene derivative. The product may then be conveniently isolated from the reaction mixture by precipitating the product.

A preferred embodiment of the invention is the conversion of 5,6-dichloro-diosgenin acetate to the new compound 5,6 - dichloro - $\Delta^{16}$ - pregnene - 3 - ol - 20 - one-3-acetate, and to the formation of new intermediates in this conversion, which is particularly useful in the synthesis of Reichstein's Substance S. This process is carried out by chlorinating diosgenin acetate (Compound V) at low temperatures to form 5,6-dichloro-diosgenin acetate (Compound VI). This compound is then treated with an acylating agent such as acetic anhydride in the presence of an amine catalyst to form the new compound dichloro pseudo-sapogenin (Compound VII), which is readily converted by mild oxidation to 5,6-dichloro - pregnane - 3,16 - diol - 20 - one - 3 - acetate-16 - ($\gamma$ - acetoxy - $\alpha$ - methylvalerate) (Compound VIII), which is then heated under acidic conditions to form 5,6-dichloro - $\Delta^{16}$ - pregnene - 3 - ol - 20 - one - 3 - acetate (Compound IX). The reaction may be chemically represented as follows:

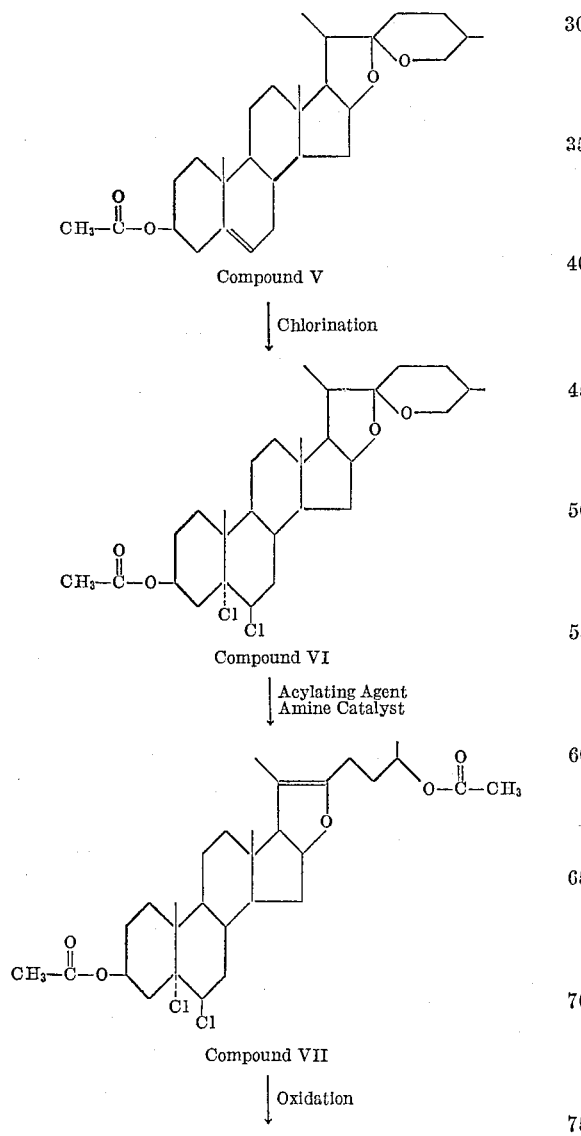

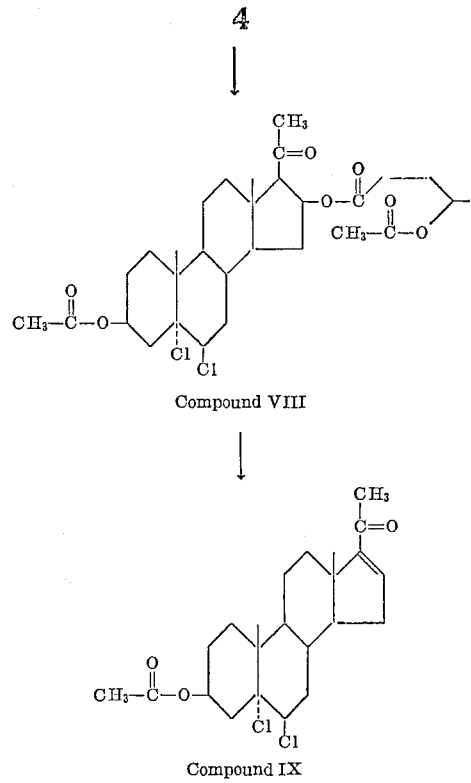

The 5,6 - dichloro - $\Delta^{16}$ - pregnene - 3 - ol - 20 - one-3-acetate is converted to $\Delta^4$-pregnene-17$\alpha$,21-diol-3,20-dione (Reichstein's Substance S) by treating with hydrogen to saturate the $\Delta^{16}$ unsaturated group, and this compound is then acylated to produce the corresponding $\Delta^{17}$-20-enol acylated derivative. The enol acylate is reacted with an oxidizing agent to produce the corresponding 17,20-epoxide which on hydrolysis is converted to the 17$\alpha$-hydroxy-20-keto compound. This latter compound is then reacted with bromine to produce the corresponding 21-bromo compound, which is converted to the 21-acyloxy compound by treatment with a salt of a lower aliphatic acid. Upon treating this 21-acyloxy compound with an oxidizing agent, the corresponding 3-keto compound is obtained which, upon treatment with a dehalogenating agent, forms the 21-acylate of $\Delta^4$-pregnene-17$\alpha$-21-diol-3,20-dione which by hydrolysis with alkali forms $\Delta^4$-pregnene-17$\alpha$-21-diol-3,20-dione.

The following examples are given for purposes of illustration.

*Example 1*

A mixture of 5.0 g. of diosgenin acetate, 25 ml. of acetic anhydride, 5.5 ml. of pyridine, and 5.0 ml. of acetyl chloride was heated under reflux for three hours. The cooled mixture was poured into 100 ml. of an ice and water mixture, and stirred until the product solidified. The crude product was collected by filtration and recrystallized from aqueous ethanol. The yield was 88% of pseudo-diosgenin diacetate having a melting point of 91 to 94° C.

*Example 2*

A mixture of 50.0 g. of diosgenin acetate, 250 ml. of acetic anhydride, 27.5 ml. of pyridine, and 18.6 ml. of acetyl chloride was refluxed for three hours, and the crude product isolated by pouring into ice water and filtering. The crude product was taken up in 500 ml. benzene and the small aqueous phase formed was separated, and the resulting solution dried with anhydrous sodium sulfate. The benzene solution was treated with activated charcoal and the solvent removed by vacuum distillation. Recrystallization of the residue from 200 ml. of methanol gave 42.7 g. (87.5% yield) of pseudo-diosgenin diacetate, M.P. 94–96° C. $(\alpha)_D^{24}$—40.6° (chloroform). Chromatography on magnesium silicate gave pure pseudo-diosgenin diacetate, M.P. 100–101° C., $(\alpha)_D^{24}$—39.9° (chloroform).

Example 3

A mixture of 10 g. of diosgenin acetate, 50 ml. of acetic anhydride, and 5.1 g. of pyridine hydrochloride was heated under reflux for two and one-half hours. The mixture was then poured into ice water and the product collected by filtration and washed with 10 ml. of cold methanol. After recrystallization from methanol the product, pseudo-diosgenin diacetate, weighed 7.07 g. and had a melting point of 93 to 100° C.

Example 4

A mixture of 25 g. of diosgenin acetate, 125 ml. of acetic anhydride, 9.1 ml. of concentrated hydrochloric acid, and 9.5 ml. of pyridine was heated under reflux for two and one-half hours. The product was isolated in the usual way and was recrystallized from methanol to yield 20.0 g. (73%) of pseudo-diosgenin diacetate, having a melting point of 96–98° C.

Example 5

A mixture of 10.0 g. of diosgenin acetate, 50 ml. of acetic anhydride, 3.9 ml. of quinoline, and 1.9 ml. of acetyl chloride was heated under reflux for three hours. After isolation in the usual way and recrystallization from methanol, the product, pseudo-diosgenin diacetate, weighed 9.5 g. (87% yield) and had a melting point of 93–102° C., $(\alpha)_D^{24}$—58.1° (chloroform).

Example 6

A mixture of 25 g. of diosgenin acetate, 125 ml. of acetic anhydride, 12.1 ml. of 2,4,6-trimethylpyridine, and 7.1 ml. of acetyl chloride was refluxed for two and one-half hours, and the product was isolated and recrystallized from methanol in the usual way. The yield was 22.0 g. (81%) of pseudo-diosgenin diacetate, having a melting point of 89–97° C., $(\alpha)_D^{24}$—56.8° (chloroform).

Example 7

To a mixture of 0.5 ml. of acetyl chloride, 0.1 ml. of pyridine and 2.5 ml. of acetic anhydride was added 0.5 g. of $\Delta^{4,6}$-3-keto-isospirostadiene. The resulting mixture was heated on a steam bath at approximately 75–80° C., in a nitrogen atmosphere, for a period of about fifteen hours. The volatile components were evaporated from the reaction mixture in vacuo, and the residual material was triturated with methanol to give a crystalline product. This material was recrystallized twice from methanol to give substantially pure $\Delta^{3,5,7,20}$-3-26-diacetoxy-furo-statetraene, M.P. 100–102° C.

*Analysis.*—Calc. for $C_{31}H_{42}O_5$: C, 75.27; H, 8.56. Found: C, 75.52; H, 8.39.

Example 8

A mixture of 50 g. of diosgenin acetate, 250 ml. of acetic anhydride, 26.2 ml. of pyridine, and 15.7 ml. of acetyl chloride was heated at gentle reflux for three hours. The mixture was then distilled at atmospheric pressure until the volume was 110 ml. After cooling to room temperature, a solution of 16.5 g. of sodium acetate in 400 ml. of glacial acetic acid and 100 ml. of water was added. To the well-stirred mixture, a solution of 18 g. of chromic acid in 20 ml. of water was added during ten minutes. Stirring was continued for 20 minutes more, the temperature being maintained at 25° C. during the oxidation. Two milliliters of methanol were added to the mixture, which was then heated at reflux for one and one-half hours. The mixture was then cooled to 25° C., and 150 ml. of water were added slowly with rapid stirring. The precipitated product was collected by filtration, and the cake was washed successively with 75 ml. of 66% acetic acid, 500 ml. of water, 100 ml. of methanol, and 100 ml. of petroleum ether. The dried crude product had a melting point of 164–172° C.; $\lambda_{max}$. 238 m$\mu$, $E_{1\,cm.}^{1\%}$ 241 in ethanol The crude product was taken up in 80 ml. of hot benzene, filtered, and concentrated to a small volume. One hundred milliliters of Skellysolve D were added, and the resulting solution was concentrated until crystallization commenced. After chilling at 5° C., substantially pure $\Delta^{5,16}$-pregnadiene-3$\beta$-ol-20-one acetate was obtained in 54% yield, having a melting point of 172–175.5 C., $\lambda_{max}$. 238 m$\mu$.

$E_{1\,cm.}^{1\%}$ 261 in ethanol

Example 9

One hundred grams of diosgenin acetate in 750 cc. of chloroform containing 18.2 cc. of pyridine was cooled to —60° C. in a Dry Ice-acetone bath. A 5% excess of 1.6 moles of chlorine in carbon tetrachloride was added slowly with stirring over a 20 minutes period. Stirring was continued and the almost colorless solution allowed to warm to +15° C. over a period of 2.75 hours. The mixture was washed with 500 cc. of 5% hydrochloric acid, 500 cc. of a saturated sodium chloride solution, 100 cc. of a 5% sodium bicarbonate solution, and 250 cc. of water, dried over sodium sulfate, and taken to dryness in vacuo. The crude pale yellow product (120 g.) of 5,6-dichloro diosgenin acetate was recrystallized from 800 cc. of ethyl acetate, yielding a first crop of 64.7 g. of white prisms, M.P. 219.5–221.5° C. (56% of theory) and a second crop of 7.7 g. of (7% of theory M.P. 214–219° C. The analytical sample was recrystallized from ethanol, M.P. 221–224° C., $[\alpha]D$=—102°; calcd. for $C_{29}H_{44}O_4Cl_2$: C, 66.02; H, 8.41; Cl, 13.44. Found: C, 65.91; H, 7.83; Cl, 13.60.

Example 10

Twenty-five grams of 5,6-dichlorodiosgenin acetate was refluxed for four hours in 125 cc. of acetic anhydride containing 6.8 cc. of acetyl chloride and 11.5 cc. of pyridine. The mixture was poured into two liters of ice water and the gummy brown solid which separated was taken up in 400 cc. of ether and washed with 100 cc. of water, three times with 100 cc. of 5% sodium hydroxide, and again with water, dried over sodium sulfate, decolorized twice with norite, and concentrated to dryness. The crude product (19.7 g.) was recrystallized from 100 cc. of methanol. The yield was 12.9 g. (45% of theory) of a yellow waxy solid, 5,6-dichloro-pseudo-diosgenin diacetate, M.P. 90–108° C. An analytical, sample, repeatedly recrystallized from methanol, melted at 126–129.5° C., $[\alpha]D$=—33°. Calcd. for $C_{31}H_{46}O_5Cl_2$: C, 65.36; H, 8.14; Cl, 12.45. Found: C, 65.73; 65.82; 7.00; 8.26; Cl, 12.64.

Example 11

The 12.9 g. of 5,6-dichloro-pseudo-diosgenin diacetate, obtained in Example 10, was dissolved in 150 cc. of acetic acid containing 3.8 g. of sodium acetate and held at 20–25° while 3.9 g. of chromic acid in 6 cc. of water was added dropwise over a ten minute period. Stirring was continued for an additional ten minutes and, after adding 3 cc. of methanol, for a third ten minutes period. The mixture was then refluxed for 90 minutes, cooled, diluted with an equal volume of water, and extracted with two 50 cc. portions of benzene. After washing with water, 5% sodium hydroxide, and a saturated sodium chloride solution, the benzene solution was dried over sodium sulfate and evaporated to dryness in vacuo. The yield was 10.2 g., (U.V. assay 70%) of $\Delta^{16}$-20-ketone based on $E_N$=9,600, $\lambda_{max}$.=2380 A. The crude product was chromatographed on acid-washed alumina, and the benzene eluate (6.0 g.) recrystallized from 45 cc. of methanol plus 5 cc. of acetone. Yield, 4.15 g., M.P. 155.5–159° C. (U.V. assay 94%). A second recrystallization gave 3.75 g. of Δ16-5,6-dichloropregnenolone acetate, M.P. 156.5–158.5° C., (U.V. assay 97%) which did not depress the melting point of an authentic sample of the material.

Steroid sapogenins on which this invention may be practiced include not only the aglycones of the naturally occurring steroid saponines, but also the nuclear transformation product as for example, the substance derived from the aglycone by change in rings A and/or B which leave the side chain attached to ring D still intact and like that in the aglycones. Thus, this invention may be practiced on steroidal sapogenins such as smilagenin, sarsasapogenone, 3-desoxy-sarsasapogenin, the sarsasapogenyl chlorides and the like.

Any departure from the above description which conforms to the present invention is intended to be included within the scope of the claims.

We claim:

1. The process for the preparation of steroidal compounds in high yield, which comprises isomerizing the side chain attached to ring D of a steroidal sapogenin, selected from the group which consists of tigogenin, digitogenin, gitogenin, chlorogenin, diosgenin and sarsasapogenin; their 5,6-dichloro derivatives; and lower alkanoyl esters and ketone derivatives (obtained by oxidation of nuclear hydroxy group) of the foregoing, by reacting the sapogenin with an acylating agent in the presence of a tertiary amine catalyst to produce the corresponding pseudo-sapogenin.

2. The process for the preparation of steroidal compounds in high yield, which comprises isomerizing the side chain attached to ring D of a steroidal sapogenin, selected from the group which consists of tigogenin, digitogenin, gitogenin, chlorogenin, diosgenin and sarsasapogenin; their 5,6-dichloro derivatives; and lower alkanoyl esters and ketone derivatives (obtained by oxidation of nuclear hydroxy groups) of the foregoing, by reacting the sapogenin with an acylating agent under approximately atmospheric pressure in the presence of a tertiary amine catalyst to produce the corresponding pseudo-sapogenin.

3. The process for the preparation of steroidal compounds in high yield, which comprises isomerizing the side chain attached to ring D of a steroidal sapogenin, selected from the group which consists of tigogenin, digitogenin, gitogenin, chlorogenin, diosgenin and sarsasapogenin; their 5,6-dichloro derivatives; and lower alkanoyl esters and ketone derivatives (obtained by oxidation of nuclear hydroxy groups) of the foregoing, by reacting one mole of the sapogenin with about 3 to 4 moles of an acylating agent under approximately normal atmospheric pressure in the presence of about 3 to 4 moles of a tertiary amine catalyst to produce the corresponding pseudo-sapogenin.

4. The process for the preparation of steroidal compounds in high yield, which comprises isomerizing the side chain attached to ring D of a steroidal sapogenin, selected from the group which consists of tigogenin, digitogenin, gitogenin, chlorogenin, diosgenin and sarsasapogenin; their 5,6-dichloro derivatives; and lower alkanoyl esters and ketone derivatives (obtained by oxidation of nuclear hydroxy groups) of the foregoing, by reacting the sapogenin with an acylating agent under approximately normal atmospheric pressure in the presence of a tertiary amine catalyst at a temperature below 175° C. to produce the corresponding pseudo-sapogenin.

5. The process according to claim 4, wherein the reaction is conducted under reflux with an acylating agent boiling below 175° C.

6. The process according to claim 4, wherein the acylating agent comprises a lower alkanoic anhydride and an acidic agent.

7. The process according to claim 4, wherein the acylating agent comprises a lower alkanoic anhydride and a lower alkanoic acid chloride.

8. The process according to claim 4, wherein the acylating agent comprises a lower alkanoic anhydride and hydrogen chloride.

9. The process according to claim 4, wherein the amine catalyst is present in greater molar quantities than the steroidal sapogenin.

10. The process according to claim 4, wherein the amine catalyst is pyridine.

11. The process according to claim 4, wherein the amine catalyst is quinoline.

12. The process according to claim 4, wherein the amine catalyst is a collidine.

13. The process according to claim 4, wherein the amine catalyst is pyridine hydrochloride.

14. The process according to claim 4, wherein the steroidal sapogenin is diosgenin acetate.

15. The process according to claim 4, wherein the steroidal sapogenin is Δ4,6-3-keto-isospirostadiene.

16. The process according to claim 4, wherein the steroidal sapogenin is 5,6-dichlorodiosgenin acetate.

17. The process which comprises isomerizing the side chain attached to ring D of diosgenin acetate by reacting the diosgenin acetate with an acylating agent comprising acetic anhydride and an acidic agent under approximately atmospheric pressure in the presence of a tertiary amine catalyst to produce pseudo-diosgenin diacetate.

18. The process which comprises isomerizing the side chain attached to ring D of 5,6-dichlorodiosgenin acetate by reacting the 5,6-dichlorodiosgenin acetate with an acylating agent comprising acetic anhydride and an acidic agent in the presence of a tertiary amine catalyst to produce 5,6-dichloro-pseudo-diosgenin diacetate.

19. 5,6-dichloro-pseudo-diosgenin diacetate.

20. A process for the production of pseudo-diosgenin diacetate which comprises refluxing at atmospheric pressure diosgenin acetate, pyridine, HCl and acetic anhydride for two and one-half hours to obtain pseudo-diosgenin diacetate.

21. The process for the preparation of 5,6-dichloro-Δ16-pregnene-3-ol-20-one-3-acetate in high yield, which comprises isomerizing the side chain attached to ring D of 5,6-dichlorodiosgenin acetate by reacting the compound with an acylating agent comprising an organic acid anhydride and an acidic agent under approximately atmospheric pressure in the presence of a tertiary amine catalyst to produce the corresponding pseudo-sapogenin, oxidizing the pseudo-sapogenin by treatment with a mild oxidizing agent without separating the pseudo-sapogenin from the initial reaction mixture, and then heating the oxidation product in an acidic medium to produce 5,6-dichloro-Δ16-pregnene-3-ol-20-one-3-acetate.

22. A compound of the formula:

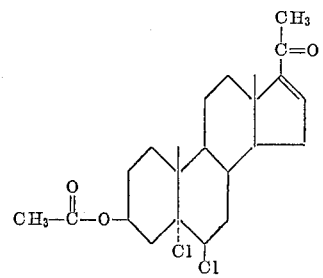

23. 5,6-dichloro-Δ16-pregnene-3-ol-20-one 3-(lower hydrocarbon carboxylic acylate).

24. 5,6-dichloro-pseudo-diosgenin bis(lower hydrocarbon carboxylic acylate).

(References on following page)

References Cited in the file of this patent

UNITED STATES PATENTS

| | | |
|---|---|---|
| 2,352,849 | Marker | July 4, 1944 |
| 2,352,850 | Marker | July 4, 1944 |
| 2,352,852 | Marker | July 4, 1944 |
| 2,632,008 | Could | Mar. 17, 1953 |
| 2,660,585 | Murray | Nov. 24, 1953 |
| 2,667,498 | Julian | Jan. 26, 1954 |

OTHER REFERENCES

Wagner: J. Am. Chem. Soc., pp. 2202, 2210, vol. 69 (1947).